(12) United States Patent
Salter et al.

(10) Patent No.: US 6,209,173 B1
(45) Date of Patent: Apr. 3, 2001

(54) HINGE MECHANISM (75) Inventors: Tony Salter, Hampshire; Graeme Fleming, Surrey, both of (GB); Kenneth Kwong, New Territory (HK)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/320,614

(22) Filed: May 26, 1999

(30) Foreign Application Priority Data

May 29, 1998 (GB) .................................................. 9811674

(51) Int. Cl.[7] .............................. E05C 17/64; E05D 11/10
(52) U.S. Cl. ................................. 16/342; 16/336; 16/335
(58) Field of Search ............................ 16/342, 341, 337, 16/334, 335, 336; 379/433, 434

(56) References Cited

U.S. PATENT DOCUMENTS

| 4,617,699 | * | 10/1986 | Nakamura | 16/342 |
| 4,821,374 | * | 4/1989 | Gavagan | 16/342 |
| 4,984,706 | | 1/1991 | Cadwell et al. | 220/334 |
| 5,185,790 | * | 2/1993 | Mischneko | 16/334 |
| 5,316,167 | | 5/1994 | Kay | 220/328 |
| 5,335,273 | | 8/1994 | Takagi et al. | 379/433 |
| 5,500,982 | * | 3/1996 | Hosoi | 16/342 |
| 5,564,772 | * | 10/1996 | Miller | 16/342 |
| 5,615,259 | * | 3/1997 | Gilbert | 379/433 |
| 5,649,309 | | 7/1997 | Wilcox et al. | 455/90 |
| 5,651,063 | | 7/1997 | Ji et al. | 379/433 |
| 5,715,575 | * | 2/1998 | Kubota | 16/342 |
| 5,918,348 | * | 7/1999 | Carpenter et al. | 16/342 |
| 6,035,491 | * | 3/2000 | Hartigan et al. | 16/342 |

FOREIGN PATENT DOCUMENTS

| 0 732 474 A1 | 9/1996 | (EP) . |
| 0 772 333 A2 | 5/1997 | (EP) . |
| WO 92/17973 | 10/1992 | (WO) . |
| WO 92/17974 | 10/1992 | (WO) . |

* cited by examiner

Primary Examiner—Chuck Y. Mah
(74) Attorney, Agent, or Firm—Perman & Green, LLP (57) ABSTRACT A hinge mechanism for pivotally connecting first and second housings of a portable electronic device for movement between closed and open positions, the mechanism comprising a hinge shaft mounted for rotation with the first housing and providing a camming surface, and resilient means mounted for rotation with the second housing and arranged to cooperate with the camming surface so as to vary loading of the resilient means on the camming surface for relative rotation therebetween.

18 Claims, 7 Drawing Sheets

HINGE MECHANISM

BACKGROUND OF THE INVENTION

The present invention relates to a hinge mechanism, more particularly, but not exclusively, to a hinge mechanism for a portable radio communication apparatus.

Certain designs of portable radio communication apparatus, such as radio telephones, are provided in two pivoted parts consisting of a main body and a cover member (or flip) which is usually hinged at the top or bottom end of the body. The cover member can be moved between a closed position overlaying a portion of the face of the body, typically the keypad, and an open position pivoted away from the body, exposing the keypad and ready for use. The main body houses the majority of the electronic components of the radiotelephone, whilst the flip sometimes houses an earpiece, or microphone or LCD display. Such radio telephones are generally known as flip or folding phones, and as well as offering protection for the keypad from inadvertent activation, can also make for a more compact design of phone.

A wide variety of folding phones are currently available, employing many different hinge solutions. Known hinge mechanisms range from relatively simple pin/recess arrangements to more sophisticated assemblies comprising springs, cams, followers and latching mechanisms.

SUMMARY OF THE INVENTION

The challenge faced by the present inventors was to design an alternative improved hinge mechanism which met the main criteria of:
  reliability, in terms of the number of opening/closing operations,
  smooth motion and good action, offering a slight resistance to movement,
  providing detent bias in the closed and open positions, and
  a positive overideable flip stop in the open position
  ease of assembly.

Accordingly, in one aspect the present invention provides a hinge mechanism for pivotally connecting first and second housings of a portable electronic device for movement between closed and open positions, the mechanism comprising a hinge shaft mounted for rotation with the first housing and providing a camming surface, and resilient means mounted for rotation with the second housing and arranged to cooperate with the camming surface so as respectively to load the resilient means corresponding to different orientations with respect to the camming surface for relative rotation therebetween By means of the invention, the hinge mechanism provides a varying torque between the resilient means and the camming surface which causes relative rotation of the resilient means and the camming surface.

In a preferred embodiment, when the first and second housings are in the open position they are mutually biased towards the open position, and when the first and second housings are in the closed position they are mutually biased towards the closed position.

BRIEF DESCRIPTION OF THE DRAWINGS

Thus, the hinge mechanism provides a detent torque for the housings in the closed and open positions, and also offers some resistance to rotational movement which enhances the feel of the opening and closing motion.

It is preferred that the camming surface is shaped to define stable and unstable orientations for the resilient means, the resilient means tending towards the stable orientation in said open and closed positions. In this way, the resilient means indexes around the camming surface.

In a preferred embodiment the resilient means comprises a pair of spring arms acting on opposite sides of the camming surface.

Advantageously, the resilient means is carried in a retainer and the retainer is coupled to the second housing. This affords the hinge mechanism a modular design. The retainer conveniently comprises a longitudinally split tube, each half of the tube carrying respective resilient means.

It is preferred that the camming surface comprises opposing planar surfaces and that the planes defined by the planar surfaces are offset from the vertical axis of the hinge shaft. This conveniently provides for the detent torque.

In an advantageous embodiment, the hinge shaft carries a projection adapted to abut a corresponding projection provided on the second housing, whereby the abutment of the projections supports the second housing in relation to the first housing in said open position. Optionally, said projections are adapted to traverse one another if the housings are extended beyond said open position.

The invention extends to a radio telephone having first and second housings and including a hinge mechanism as hereinbefore defined for pivotally connecting said housings.

The invention will now be described by way of example with reference to the following drawings in which:

FIG. 3b is an isometric view an assembled hinge module of FIG. 3a;

DETAILED DESCRIPTION OF THE INVENTION

Figure 1:
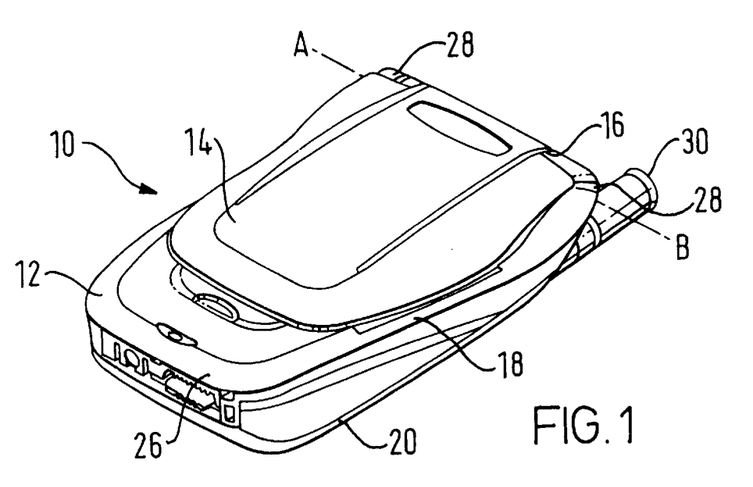
FIG. 1 is a front perspective view of a radiotelephone in a closed position and incorporating a hinge mechanism in accordance with the present invention.
Figure 2:
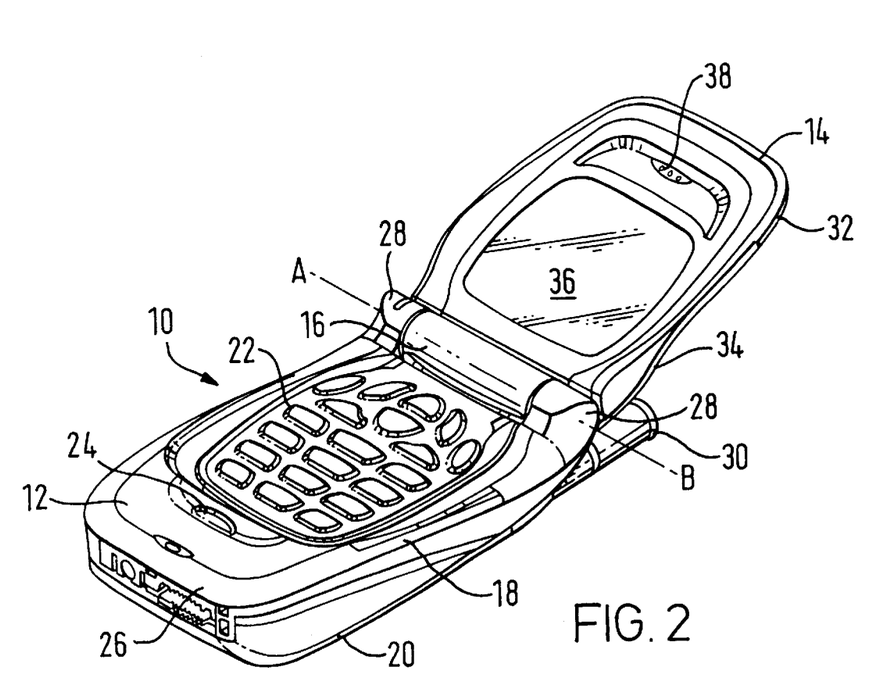
FIG. 2 is front perspective view of a radiotelephone in an open position and incorporating a hinge mechanism in accordance with the present invention.

Referring initially to FIGS. 1 and 2, there is shown a portable radiotelephone 10 comprising a main body 12 pivotally connected to a flip 14 by a hinge 16 having an axis of rotation indicated by the line AB. FIGS. 1 and 2 show the flip 14 in respective closed and open positions in relation to the main body 12.

The main body 12 comprises an upper casing 18 and lower casing 20 which together house the main internal control circuitry of the radiotelephone 10. The upper casing 18 carries a keypad 22 and power button 24, and forms, towards the front end, a chin 26, below which is housed a microphone. The rear end of the upper casing upsweeps to a pair of knuckles 28 of the hinge 16. A slidable antenna 30 is provided at the side of the main body 12.

The flip 14 likewise comprises an upper casing 32 and the lower casing 34 which join together to house further electronic components such as an LCD display 36, an earpiece 38, and associated circuitry. The foot of the flip 14 is formed into a tube 39 and encases part of the hinge module.

The microphone and the earpiece 38 are positioned at opposite ends of the two parts of the radiotelephone to maximise the distance between them, such that this distance approximates the distance between the ear and the mouth of the user.

With the flip 14 in the closed position of FIG. 1 it covers the keypad 22 and its upper edge skirts the chin 26. In the open position of the FIG. 2, the flip 14 is pivotally spaced from the main body 12 and the radiotelephone 10 is ready for use. It is notable that in the open position with the radiotelephone held up to a user's ear, the flip 14 at least partially screens the antenna 30 and this provides useful blocking against radio magnetic waves.

Figure 3A:
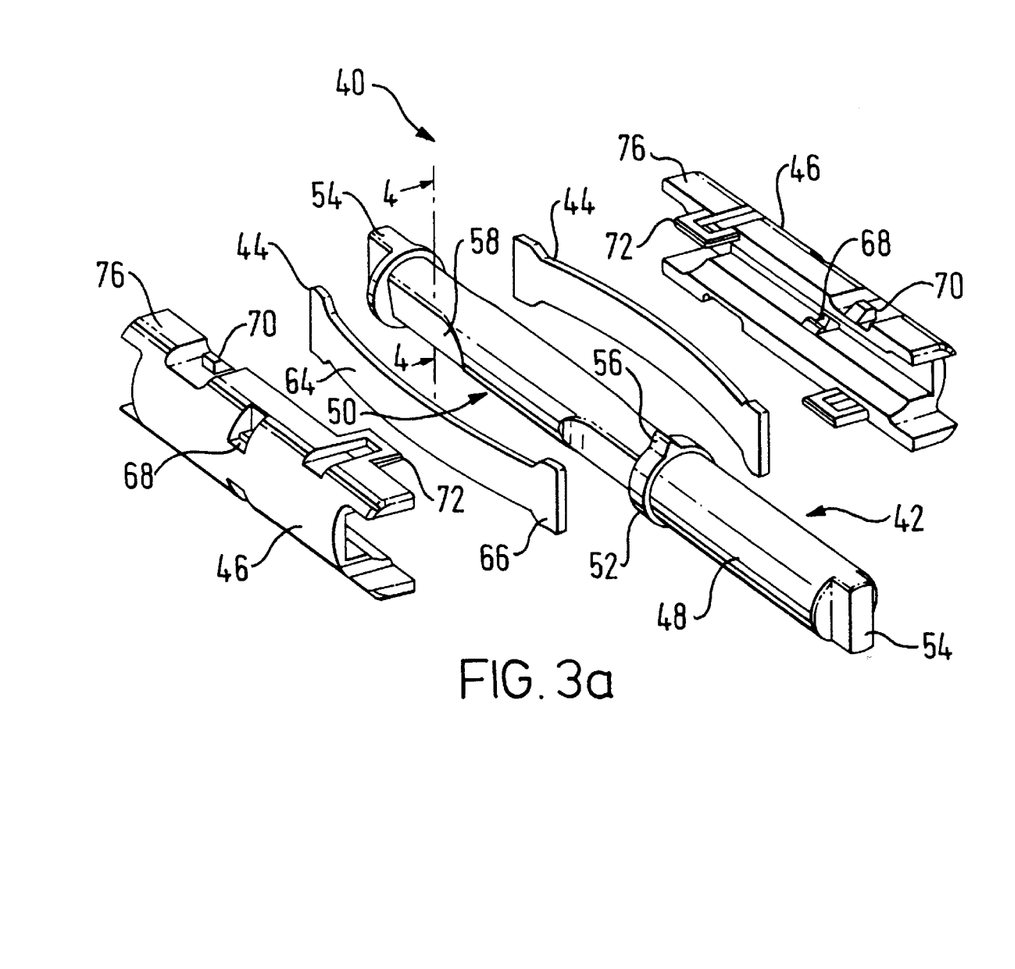
FIG. 3a is an exploded isometric view of a hinge module of a preferred embodiment of the present invention.

Turning to FIG. 3a, a hinge module 40 is shown in the exploded isometric view as comprising a central hinge shaft 42 in part sandwiched by a pair of leaf springs 44 which in turn are encased by respective halves of a spring retainer tube 46.

Figure 4:
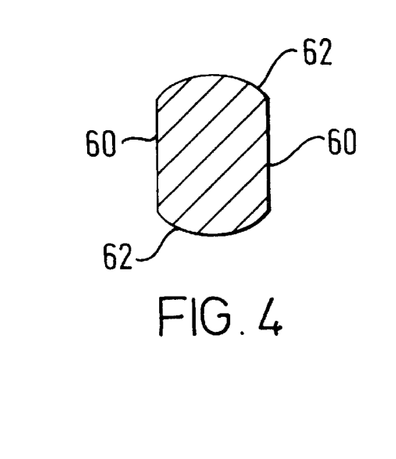
FIG. 4 is a schematic cross sectional view of a camming profile of the preferred embodiment.

The hinge shaft 42 is a one-piece integral unit consisting of several distinguishable sections: a shank 48 and a cam section 50 separated by a raised collar 52, the two ends of the shaft being provided with rectangular locating bosses 54 for mounting in the hinge knuckles 28 (to be described later).The shank 48 has a generally circular cross section and leads to the raised collar 52 which carries a radial lug 56 forming part of the stop feature of the hinge mechanism. Inward of the collar 52 is the cam section 50 which consists of two spaced apart camming surfaces 58. Each camming surface 58 is formed from opposite pairs of regions where the surface of the hinge shaft 42 is substantially flat. A cross section of a camming surface 58 is illustrated in FIG. 4 and comprises two opposite substantially parallel flat major faces 60 connected by two opposite rounded minor faces 62. Here, it should be explained that the planes of the flat major faces 60 are not parallel to the vertical axes of the locating bosses 54. Rather, the planes of the flat major faces are offset by 10° from the vertical defined by the vertical axes of locating bosses 54 for a purpose which will become apparent later. The camming surfaces 58 are closed at their outer ends by a pair of shoulders formed by the flange walls of the distal locating boss 54 and the collar 52.

Turning to the pair of leaf springs 44, since these are identical, for clarity the description will relate to one of the pair. The leaf spring 44 is elongate and generally planar although it has a convex bow along its length. The spring 44 has a stem 64 joining its ends which are spatulate 66 and having a width greater than that of the stem 64. The width of the spatulate ends 66 is selected to match or be slightly wider than the width of the major faces 60 of the camming surfaces 58 of the hinge shaft 42 so as to apply a more even force over the camming surfaces 58. In a natural unstressed state the spring 44 has a bowed height of typically 1.85 mm.

Moving on to the spring retainer tube 46, this consists of two halves of a longitudinally split cylindrical tube, each halve holding one of the pair of leaf spring 44. Formed in the side wall of a retainer halve 46 is a pair of jaws 68 into which the leaf spring 44 is pressed clipped into position. Each of the retainer halves 46 is provided with corresponding lugs 70 and catches 72 so that the two halves can be latched together. It is advantageous that the spring retainer halves are "handed" in that the correspondence of the lugs 70 and catches 72 is such that any two halves can be assembled despite being mutually opposite; this obviates the need for separate left and right handed retainer halves. Whilst the side walls 74 of the retainer tubes are generally curved, the upper and lower walls are flat 76.

Figure 3B:
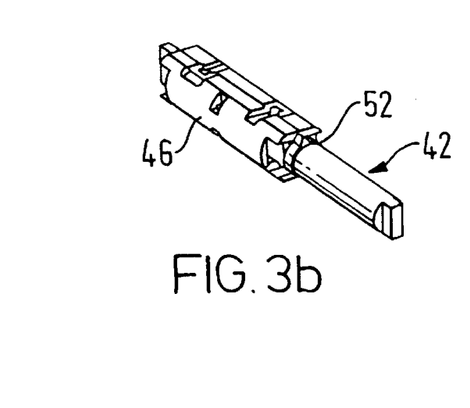

In order to assemble the hinge module, the leaf springs 44 are first clip locked into respective halves of the retainers 46. Next the spring retainer halves 46 are brought together lengthwise around the camming section 50 of the hinge shaft 42 and are latched to one another. This causes loading of the leaf springs 44 which press against camming surfaces 58 and flex outwards against the shoulders formed by the flange walls of the distal locating boss 54 and the collar 52. The bowed height of the springs in this loaded state is approximately 1.7 mm. An assembled hinge module is shown in FIG. 3b.

It is notable that it is only possible to latch the spring retainers 46 together once they are correctly aligned in relation to the hinge shaft 42, because at other locations along the shaft 42 its diameter is too large for the retainer halves to fit together.

Figure 5A:
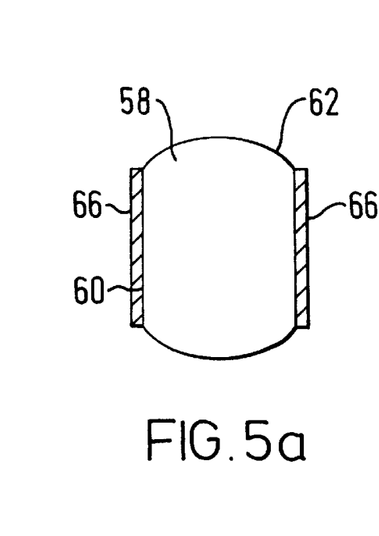
FIGS. 5a to 5d are schematic cross sectional views of the interaction of the camming surface of FIG. 4 with a pair of leaf springs.
Figure 5B:
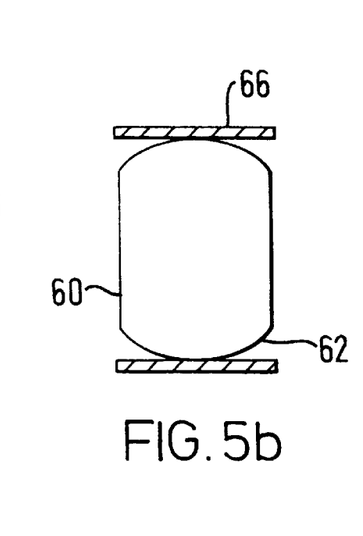

The hinge mechanism 40 operates as follows. Because in its natural condition the bow of the leaf springs 44 is greater than the space between the retainer 46 and the hinge shaft 42 camming surface, the leaf springs 44 are compressed slightly and pre-loads are introduced in the springs which give rise to spring forces on the camming surfaces. The spatulate ends 66 of the leaf springs 44 contact the camming surfaces 58 at tangents, thus the spring forces on the camming surfaces 58 are directed radially inwards. As the relative orientation of the leaf springs 44 with respect to the shaft 42 changes, so they adopt successive stable and unstable positions. At orientations when the spatulate ends 66 lie flat against the major faces 60 of the camming surface as in FIG. 5a, the springs 44 are in a stable position and there is no net torque being applied to the hinge shaft 42. In the orientation shown in FIG. 5b, the springs have moved through 90° and the spatulate ends 66 press on the opposing tips of the minor faces 62 of the camming surface 58 and momentarily reach an equilibrium.

Figure 5C:
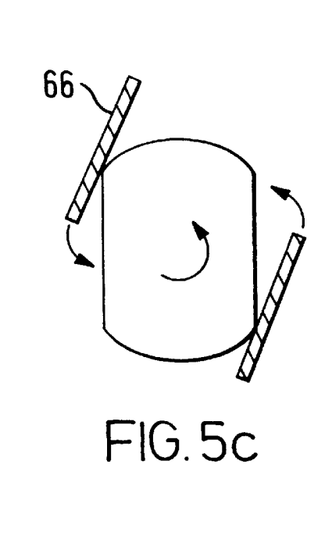
Figure 5D:
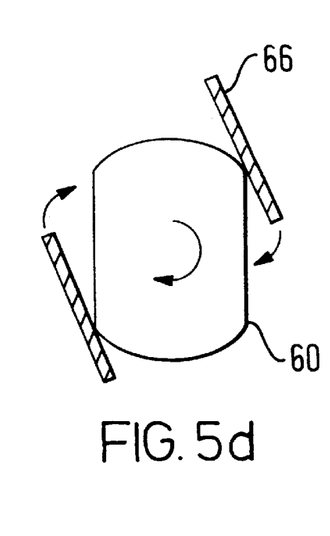

It will be understood with reference to FIGS. 5c and 5d that at other orientations around the camming surface 58, ie. partway between the major faces 60 and the tips of the minor faces 62, the leaf springs 44 are unstable inasmuch as the spatulate ends 66 apply spring forces against the camming surfaces 58 in such a manner as to induce a torque which causes the leaf springs 44 to bias towards the flat major faces 60. If from this stable position, there is relative rotation between the leaf springs 44 and the shaft 42, the springs 44 apply an opposing torque which acts to restore the leaf springs 44 to stable major faces. With appropriate spring loading and cam dimensions this action can be a snap action. Furthermore, it can seen that relative rotation of the leaf springs 44 and the camming surface 58 represents an indexing action.

Figure 6A:
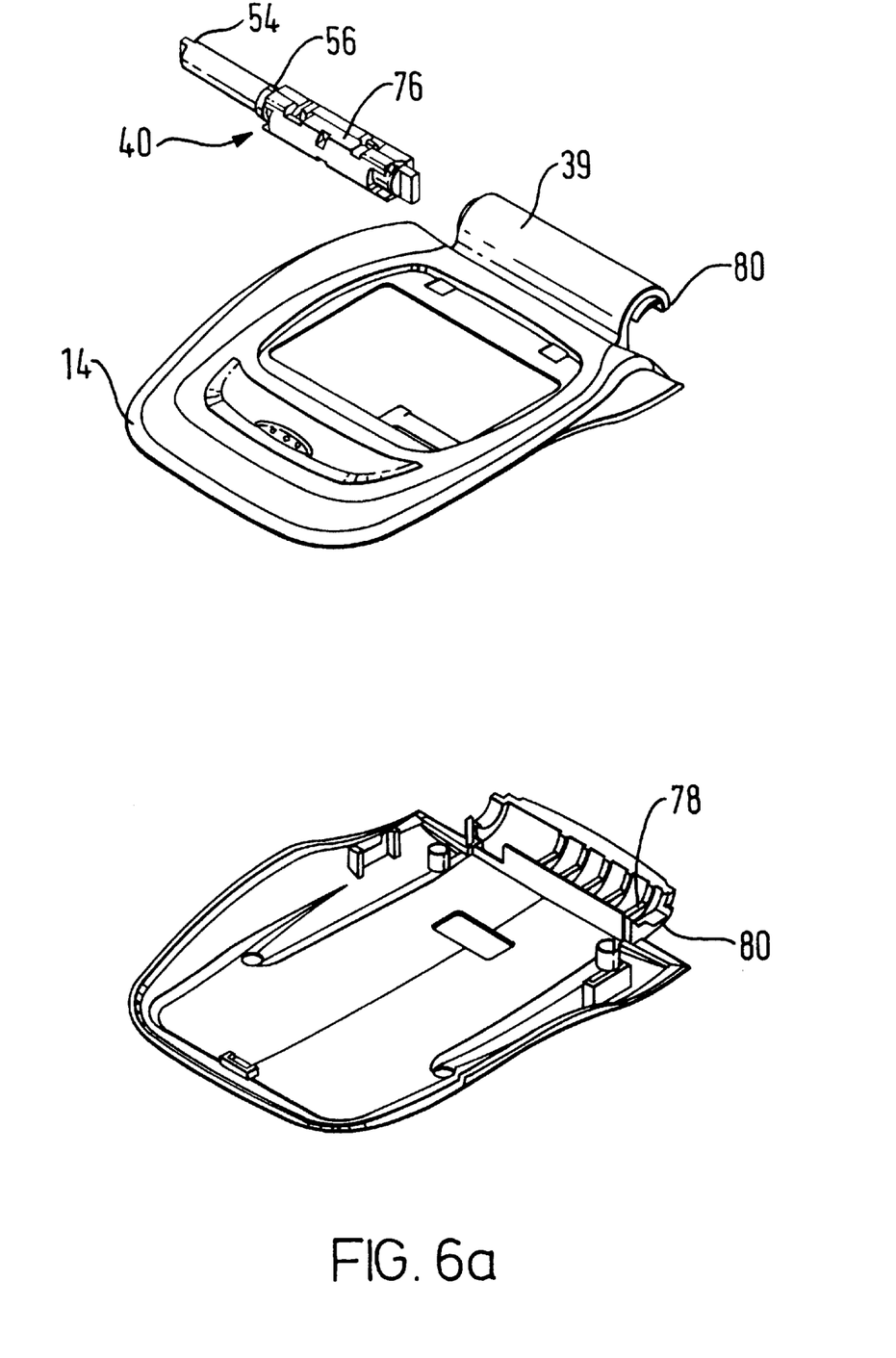
FIG. 6a is an exploded isometric view of the hinge module of FIG. 3b in a housing of the radiotelephone of FIGS. 1 and 2.

Referring now to FIG. 6a, the assembled hinge module is disposed in the hinge tube 39 of the flip 14 as illustrated. Inside the tube 39 the flat sides of the spring retainer are shaped to mate with opposing flat beds 78 provided by crosswise rails in the tube 39 and in this way prevent relative rotation between the hinge module 40 and the flip, effectively rotatably keying the two together. The step of assembling the hinge module 40 in the tube 39 requires that the hinge module 40 is inserted longitudinally from one end of the flip tube 39 having a square opening, until the inward edge of the spring retainer 46 abuts the final rail to stop it moving in any further.

Figure 6B:
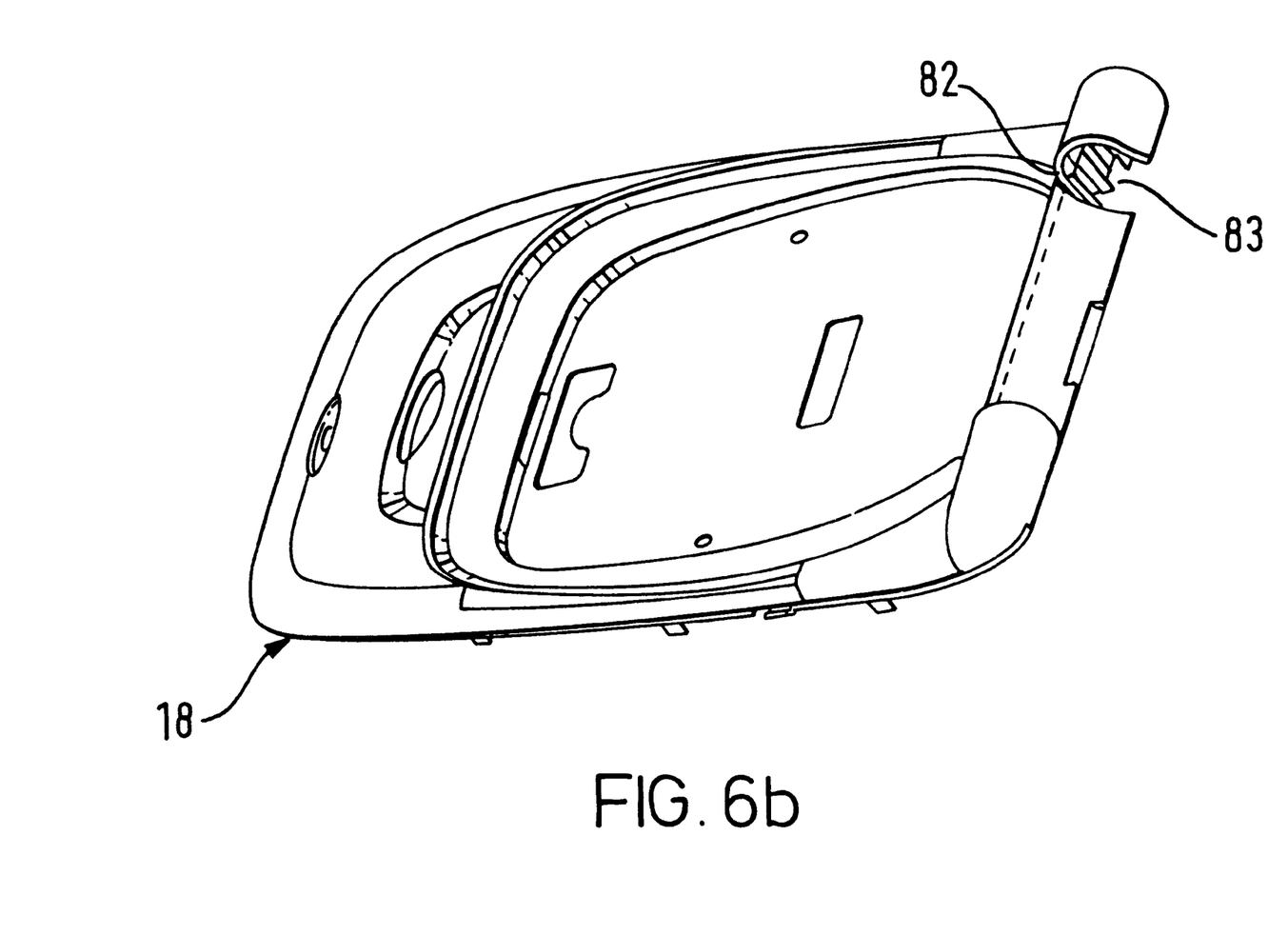
FIG. 6b is a perspective view of a hinge knuckle of the preferred embodiment.

With the hinge module inserted in the flip tube 39, the flip 14 is joined to the upper casing 18 of the main body 12. Circumferential projections 80 extending laterally from the ends of the flip tubes mate with corresponding recessed slots 82 in the inside edges of the knuckles 28 of the upper casing 18 (see FIG. 6b). This provides for the correct locating of the flip 14 and also ensures continuity of the hinge connection. The rectangular locating bosses 54 of the hinge shaft 42 are received in vertical slots 82 provided in each of the knuckles 28 of the upper casing 18. Accordingly, the shaft 42 is fixed in relation to the knuckle 28 and the reaction force to the turning force of the hinge shaft 42 is provided by the knuckle 28 in the upper casing 18.

Figure 7A:
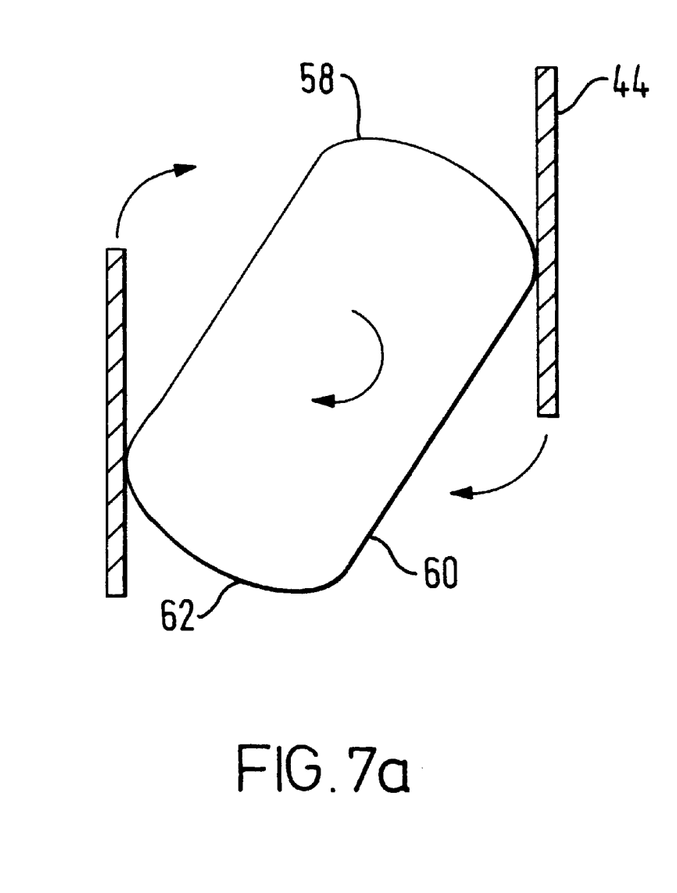
FIGS. 7a and 7b are schematic cross sectional views of the hinge with the housing of FIG. 6 in respective closed and open positions.

The operation of the hinge and the pivoting of the flip relative to the main body is of course based on the mechanism of the hinge module already described above with reference to FIGS. 5a and 5b. The flip 14 having keyed into it the hinge module 40 containing leaf springs pivots 44 around the hinge shaft 42 which remains relatively static in the main body 12. In the angular orientation associated with the flip 14 being in the closed position the configuration of the spatulate ends 66 of the leaf springs 44 in relation to the camming surfaces 58 is as shown in FIG. 7a. Rather than lying squarely on major faces 60 of the camming surfaces 58, the spatulate ends 66 press against opposite shoulders of the camming surface 58. This is due to the offset of the planes of the major faces 60 from the vertical. Accordingly, the leaf springs 44 bias towards the major faces 60 and as a result together give rise to a net clockwise turning force which is transmitted to the flip 14 causing it to be urged towards the main body 12. Since the upper edge of the flip 14 abuts the chin 26 of the radiotelephone 10 at a horizontal, a standing torque or detent torque is set up on the flip 14. In this way, in the closed position the flip 14 offers a certain amount of in-built resistance to being opened and prevents it from having a sloppy feel.

Figure 7B:
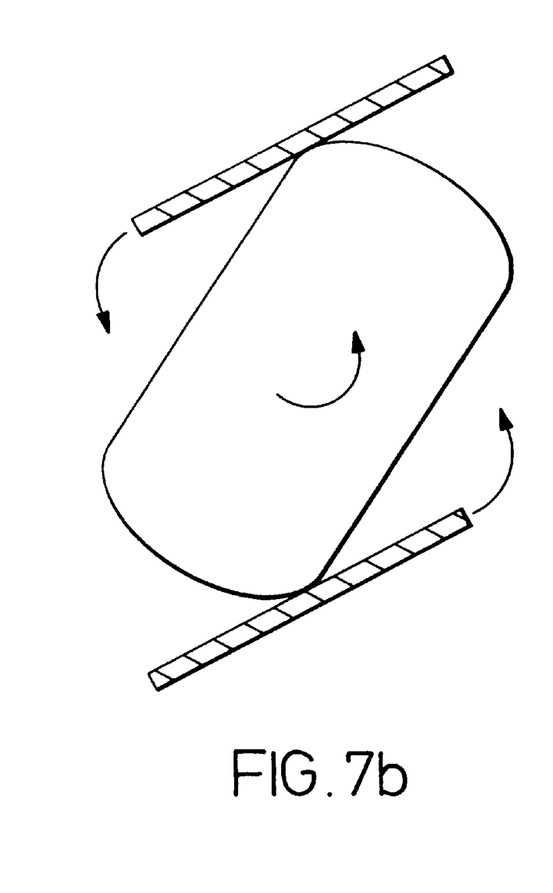

Conversely, with the flip 14 in the open position the configuration of the leaf spring 44 and the hinge shaft 42 is as illustrated in FIG. 7b. Opening of the flip 14 is facilitated by formations on the side edges and the rear of the flip. In this open position the flip 14 has travelled through 160° and the spatulate ends 66 of the leaf springs 44 have reversed orientation and press against the other pair of shoulders of the camming surface 58. Again, the spatulate ends 66 do not lie on the major faces 60 and accordingly the leaf springs 44 now transmit an anti-clockwise turning force on the flip. The flip 14 however is prevented from moving to adopt this position by a stop feature 52/84.

Figure 8:
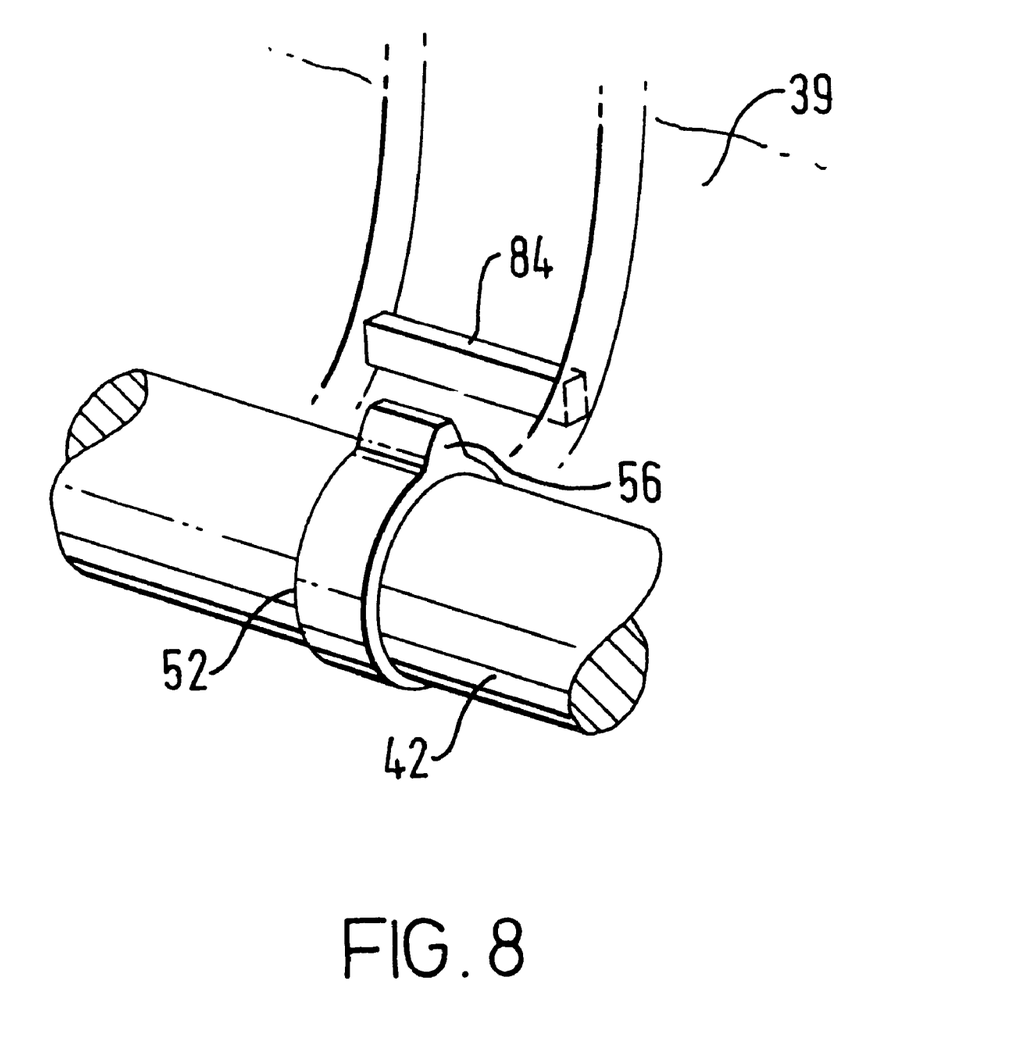
FIG. 8 is an isometric view of the safety-stop support feature of the preferred embodiment of the invention.

The stop feature is shown in FIG. 8 and comprises the raised lug 56 on the collar 52 of the hinge shaft which engages a short axial lip 84 spanning two adjacent rails extending from the internal wall of the flip hinge tube 39. When the flip is moved to the open position, the axial lip 84 approaches the lug 56 and at 160° opening catches against it. Due to the in-built detent torque of the springs 44 and camming surface 58 in this position, the flip 14 is biased in the open position. The stop feature 52/84 is designed to be positive enough to provide sufficient support for the flip 14 when it is pressed against a user's ear during a call.

However, a combination of the tolerances of the components and the inherent elasticity of the hinge materials allows the lug 56 to ride over the lip 84 if excessive force is applied to the flip. For example, if the flip 14 is in the open condition and someone inadvertently sits on the phone 10, the lug 56 overrides the axial lip 84 and the flip 14 can travel passed the 160° opening angle without breaking the flip 14, hinge 40 or stop feature 52/84. In this event, the leaf spring 44 indexes rounds to the stable major face 60. To return the flip, the user holding the main body and flip manually snaps the lug 56 back over the axial lip 84. As is apparent, this override property provides a beneficial safety feature for the radiotelephone 10 against damage.

It will be readily understood that alternative arrangements to those described above with reference to the specific embodiment can be made within the inventive concept as defined in the appended claims. For example the resilient means, instead of being a leaf spring could be an elastomeric composite.

Each feature disclosed in this specification (which term includes the claims) and/or shown in the drawings may be incorporated in the invention independently of other disclosed and/or illustrated features.

The appended abstract as filed herewith is included in the specification by reference.

What is claimed is:

1. A hinge mechanism for pivotally connecting first and second housings of a portable electronic device for pivotal movement between a closed position of the device in which the first and second housings are mutually abutting, and an open position of the device in which the first and second housing are mutually spaced, the hinge mechanism comprising a hinge shaft and resilient means biased against the hinge shaft, the hinge shaft being rotatable relative to the resilient means, and being carried by the first housing for rotation therewith, and comprising a camming surface including at least one substantially planar portion substantially defining a camming plane, the resilient means being carried by the second housing for rotation therewith and comprising at least one substantially planar body substantially defining a resilient means plane, the resilient means being arranged to cooperate with the camming surface so as to respectively load the resilient means in correspondence with the resilient means being in different orientations with respect to the camming surface, the hinge shaft being disposed in the first housing and the resilient means being disposed in the second housing so that the camming plane on the hinge shaft is offset from the resilient means plane, when the device is respectively in the closed and open positions, so as to impart a detent torque in said closed and open positions such that in the closed position the first and second housings are mutually biased together and in the open position the first and second houses are mutually biased apart.

2. A hinge mechanism according to claim 1, wherein the camming surface is shaped to define stable and unstable orientations for the resilient means, the resilient means tending towards the stable orientation in said open and closed positions.

3. A hinge mechanism according to claim 1, wherein the resilient means comprises a member that extends between, and converges to engage, two longitudinally spaced apart regions at the hinge shaft providing the camming surface.

4. A hinge mechanism according to claim 1, wherein the resilient means comprises a spring arm having spatulate ends which engage the camming surface.

5. A hinge mechanism according to claim 1, wherein the resilient means comprises a pair of spring arms acting on opposite sides of the camming surface.

6. A hinge mechanism according to claim 5, wherein each spring arm is bowed.

7. A hinge mechanism according to claim 1, wherein the resilient means is carried in a retainer and the retainer is coupled to the second housing.

8. A hinge mechanism according to claim 7, wherein the retainer comprises a longitudinally split tube, each half of the tube carrying a respective part of the resilient means.

9. A hinge mechanism according to claim 8, wherein the tube halves include complementary interengaging formations to connect the tube halves together around the hinge shaft.

10. A hinge mechanism according to claim 1, wherein the camming surface comprises opposing planar surfaces.

11. A hinge mechanism according to claim 10, wherein the planar surfaces are connected by opposing radii.

12. A hinge mechanism according to claim 10, wherein the planes defined by the planar surfaces are offset from a vertical axis of symmetry of end members of the hinge shaft which locate the hinge shaft in the first housing.

13. A hinge mechanism according to claim 12, wherein the offset is ten degrees.

14. A hinge mechanism according to claim 1, wherein the hinge shaft carries a projection adapted to abut a corresponding projection provided on the second housing, whereby the abutment of the projections supports the second housing in relation to the first housing in said open position.

15. A hinge mechanism according to claim 14, wherein the projection on the hinge shaft comprises a raised lug and the projections on the second housing comprises a lip extending from a wall of a hinge mechanism casing.

16. A hinge mechanism according to claim 14, wherein said projections are adapted to traverse one another if the housings are extended beyond said open position.

17. A hinge mechanism according to claims 16, wherein the projection on the hinge shaft traverses the projection on the second housing when contracting the housings to return the first housing to said open position.

18. A hinge mechanism according to claim 1, wherein said hinge shaft is fixed in relation to said first housing by rectangular bosses provided on the hinge shaft, said bosses mating with recessed slots provided in the first housing.

* * * * *